(12) United States Patent
Pieronek et al.

(10) Patent No.: US 10,363,775 B2
(45) Date of Patent: Jul. 30, 2019

(54) VEHICLE WHEEL AND METHOD FOR PRODUCING A VEHICLE WHEEL

(71) Applicant: THYSSENKRUPP STEEL EUROPE AG, Duisburg (DE)

(72) Inventors: David Pieronek, Dortmund (DE); Axel Grüneklee, Duisburg (DE); Markus Zörnack, Lake Orion, MI (US)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 14/904,566

(22) PCT Filed: Jun. 23, 2014

(86) PCT No.: PCT/EP2014/063161
§ 371 (c)(1),
(2) Date: Jan. 12, 2016

(87) PCT Pub. No.: WO2015/003892
PCT Pub. Date: Jan. 15, 2015

(65) Prior Publication Data
US 2016/0152069 A1     Jun. 2, 2016

(30) Foreign Application Priority Data

Jul. 12, 2013 (DE) .......................... 10 2013 107 394

(51) Int. Cl.
*B60B 3/04*        (2006.01)
*B60B 3/08*        (2006.01)
(Continued)

(52) U.S. Cl.
CPC ................. *B60B 3/12* (2013.01); *B60B 3/04* (2013.01); *B60B 3/087* (2013.01); *B60B 7/0066* (2013.01);
(Continued)

(58) Field of Classification Search
CPC ......... B60B 7/0066; B60B 7/008; B60B 7/02; B60B 7/061; B60B 7/063; B60B 7/065;
(Continued)

(56) References Cited

U.S. PATENT DOCUMENTS

| | | | | |
|---|---|---|---|---|
| 1,683,738 A | * | 9/1928 | Stanley | ..................... B60B 3/08 |
| | | | | 301/64.304 |
| 2,123,101 A | * | 7/1938 | Farr | .......................... B60B 1/10 |
| | | | | 301/37.41 |

(Continued)

FOREIGN PATENT DOCUMENTS

| | | |
|---|---|---|
| DE | 199 82 853 T1 | 4/2001 |
| DE | 101 27 639 A1 | 12/2002 |

(Continued)

OTHER PUBLICATIONS

German Language International Search Report for International patent application No. PCT/EP2014/063161; dated Aug. 29, 2014.

(Continued)

*Primary Examiner* — Kip T Kottler
(74) *Attorney, Agent, or Firm* — RMCK Law Group PLC (57) ABSTRACT

A vehicle wheel for motor vehicles may include a wheel-rim ring with an opening, a main member positioned at least partially in the opening of the wheel-rim ring, and a covering shell for at least partially covering the main member. The main member may include an attachment region with receptacles for attaching the main member and the wheel-rim ring to a vehicle. The wheel is configured to have a low weight and an adequate stiffness. Moreover, the wheel also exhibits a secure attachment and no pre-load losses while permitting a high degree of design flexibility. In some examples, the attachment region of the main member is free from the covering shell by way of, for example, a cut-out in the covering shell.

11 Claims, 4 Drawing Sheets

(51) Int. Cl.
*B60B 3/12* (2006.01)
*B60B 7/02* (2006.01)
*B60B 7/06* (2006.01)
*B60B 7/18* (2006.01)
*B60B 7/00* (2006.01)

(52) U.S. Cl.
CPC ............... *B60B 7/02* (2013.01); *B60B 7/061* (2013.01); *B60B 7/18* (2013.01); *B60B 2310/30* (2013.01); *B60B 2360/102* (2013.01); *B60B 2360/104* (2013.01); *B60B 2360/106* (2013.01); *B60B 2360/341* (2013.01); *B60B 2900/111* (2013.01); *B60B 2900/112* (2013.01); *B60B 2900/311* (2013.01); *B60B 2900/572* (2013.01); *B60B 2900/711* (2013.01); *B60Y 2200/11* (2013.01); *Y02T 10/86* (2013.01)

(58) Field of Classification Search
CPC .. B60B 7/18; B60B 3/087; B60B 3/04; B60B 3/12
USPC ............ 301/64.201, 64.203, 64.301, 64.302, 301/64.303, 64.304
See application file for complete search history.

(56) References Cited

U.S. PATENT DOCUMENTS

| | | | | |
|---|---|---|---|---|
| 2,189,743 | A * | 2/1940 | Lyon | B60B 7/00 301/37.26 |
| 5,458,401 | A * | 10/1995 | Baccman | B60B 7/00 301/37.11 |
| 5,577,809 | A * | 11/1996 | Chase | B60B 1/08 301/37.11 |
| 5,595,423 | A * | 1/1997 | Heck | B60B 7/00 301/37.36 |
| 5,664,845 | A * | 9/1997 | Maloney | B60B 7/00 301/37.36 |
| 5,845,973 | A | 12/1998 | Chase | |
| 6,270,167 | B1 * | 8/2001 | Kemmerer | B60B 7/0013 301/37.36 |
| 6,406,100 | B1 * | 6/2002 | Kinstler | B60B 7/0013 301/37.102 |
| 6,502,308 | B1 * | 1/2003 | Carfora | B21D 39/02 29/894.381 |
| 6,609,763 | B1 * | 8/2003 | Kinstler | B60B 7/0013 301/37.31 |
| 2001/0020514 | A1 * | 9/2001 | Chase | B29C 44/1233 156/292 |
| 2001/0045769 | A1 * | 11/2001 | Maloney | B60B 7/00 301/37.43 |
| 2002/0093242 | A1 * | 7/2002 | Chase | B60B 7/04 301/37.43 |
| 2003/0193236 | A1 * | 10/2003 | Maloney | B60B 7/0013 301/37.43 |
| 2004/0164606 | A1 * | 8/2004 | Chase | B60B 1/08 301/37.11 |
| 2004/0262981 | A1 * | 12/2004 | Fitzgerald | B60B 3/10 301/37.101 |
| 2005/0067882 | A1 | 3/2005 | Bluemel et al. | |
| 2005/0179312 | A1 | 8/2005 | Hauler et al. | |
| 2006/0043782 | A1 * | 3/2006 | Houten | B60B 7/0013 301/37.43 |
| 2006/0071539 | A1 | 4/2006 | Sereno | |
| 2006/0125311 | A1 * | 6/2006 | Bruce | B60B 7/06 301/37.43 |
| 2009/0278398 | A1 * | 11/2009 | Diko | B60B 7/14 301/37.102 |
| 2010/0181821 | A1 * | 7/2010 | Noriega | B60B 7/0013 301/5.1 |
| 2011/0148181 | A1 * | 6/2011 | Silva de Carvalho | B60B 7/0046 301/37.102 |
| 2011/0316324 | A1 * | 12/2011 | Kihara | B60B 3/007 301/67 |
| 2012/0007415 | A1 | 1/2012 | McCorry et al. | |

FOREIGN PATENT DOCUMENTS

| | | |
|---|---|---|
| DE | 10 2010 032 429 A1 | 3/2011 |
| DE | 10 2011 051 637 A1 | 1/2012 |
| JP | H07-149104 A | 6/1995 |
| JP | 2003-335101 A | 11/2003 |
| JP | 2006-116985 A | 5/2006 |
| WO | 2004/037562 A | 5/2004 |
| WO | 2013/026880 A | 2/2013 |

OTHER PUBLICATIONS

English translation of International Search Report for International patent application No. PCT/EP2014/063161; dated Aug. 29, 2014.
English translation of the abstract of DE 10 2010 032 429 A1.
English translation of the abstract of DE 199 82 853 T1.
English machine translation of Japanese office action issued in corresponding application No. JP 2016-524723, dated Jul. 26, 2018.

* cited by examiner

VEHICLE WHEEL AND METHOD FOR PRODUCING A VEHICLE WHEEL

CROSS REFERENCE TO RELATED APPLICATIONS

This application is a U.S. National Stage Entry of International Patent Application Serial Number PCT/EP2014/063161, filed Jun. 23, 2014, which claims priority to German Patent Application No. DE 102013107394.8 filed Jul. 12, 2013, the entire contents of both of which are incorporated herein by reference.

FIELD

The present disclosure relates to wheels for vehicles and methods of producing wheels for vehicles.

BACKGROUND

Wheels for motor vehicles, such as for example passenger motor vehicles, and in particular the main members thereof, are commonly produced from steel. Here, the main members are formed for example as areal wheel discs. It is furthermore known, for example for improved cooling or for a weight reduction, for a circle of holes to be provided in the main member. Since such wheels however often do not meet the aesthetic demands of the customers, use may be made of wheel caps or decorative covers composed for example of plastic, which substantially completely cover the main member and permit a flexible design. However, these measures often also do not meet the aesthetic demands, because the wheel caps are generally recognized as such.

By contrast, a better visual impression can be afforded by so-called light-metal wheel rims, in the case of which the wheel-rim ring and the main member are forged or cast in one piece or in multiple pieces. However, for this purpose, increased production outlay and cost expenditure in comparison with conventional steel rims must be accepted. Furthermore, corrosion resistance is often a problem even in the event of light damage to such wheels.

Furthermore, so-called steel structure wheels are known. Here, the main member can be reduced such that the main member can be of a spoke-type design. Here, too, to achieve an appealing appearance and adequate design flexibility, use is made of plastics wheel caps. It is however a particular disadvantage that, owing to the reduced main member with spoke structure, it is necessary, in order to ensure adequate stiffness and strength, to accept a weight which is up to 25% higher than that of a conventional steel type of construction. This arises in particular from the required large wall thickness of the main member. The large wall thicknesses furthermore necessitate high deformation forces during the production process, and are restricted in terms of their freedom with regard to shaping.

In view of this problem, vehicle wheels as mentioned in the introduction are proposed in the prior art of DE 101 27 639 A1. Accordingly, a wheel having a wheel-rim ring and a main member is provided with a covering shell in order to avoid large wall thicknesses. Here, the single-piece covering shell has substantially the shape of the main member and, like the main member, has openings, such that the covering shell can be attached together with the main member to the hub of the motor vehicle by way of a screw connection. For this purpose, the covering shell lies on the screw-on flange of the main member in the region of the openings. By means of the common connection of covering shell and main member to the vehicle hub, adequate stiffness of the wheel is ensured.

It has been found that, by means of such a construction, it is duly possible to achieve a lower weight with increased design freedom. However, it has been found that, in particular during operation, relative movements between the covering shell and the main member may occur, which can have an adverse effect on the screw connections and, in association with this, on a secure screw seat and on the bracing force of the screw. Furthermore, it is also desirable to achieve additional weight savings.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

Some example wheels according to the present disclosure may have a wheel-rim ring that has an opening; a main member arranged at least partially in the opening of the wheel-rim ring, wherein the main member has an attachment region with receptacles for attachment means for attachment of the vehicle wheel to the vehicle; and a covering shell for at least partially covering the main member.

One example object of the present disclosure concerns a vehicle wheel which, despite having a low weight and adequate stiffness, permits a secure attachment, in particular with reduced pre-load losses or with no pre-load losses, while permitting a high degree of design flexibility. It is furthermore sought to specify a method for producing a vehicle wheel.

The above-stated object is, in the case of a generic vehicle wheel, achieved according to a first teaching of the invention in that the covering shell is designed such that the main member is free from the covering shell at least in the region of the receptacles.

By virtue of the fact that the main member is free from the covering shell at least in the region of the receptacles, no material of the covering shell is present in the immediate vicinity of the receptacles, such that, in said region, there is no doubling-up of material by way of the material of the main member, on the one hand, and covering shell, on the other hand. It can thus be achieved in particular that the attachment means duly interact with the receptacles in the main member, but not with the covering shell, such that the covering shell does not participate in the attachment of the main member and/or of the vehicle wheel to the vehicle. For this purpose, the covering shell may for example be designed such that one or more cutouts are provided in the covering shell in the region of the receptacles, or such that a spacing of the covering shell is provided in the region of the receptacles.

It has been recognized according to the invention that the presence of the covering shell in the region of the receptacles can adversely affect the secure attachment. By means of the design of the vehicle wheel according to the invention, a secure attachment can be achieved because the required preload by way of the attachment means is not adversely affected by the presence of the covering shell in the region of the receptacles. Furthermore, it has been found that the corrosion resistance is impaired as a result of defects in the cathodic dip coating process (CDC process). At the same time, it has been identified that adequate stiffness of the vehicle wheel can be ensured even though no direct attachment of the covering shell is realized by way of the attachment means. Furthermore, owing to the modular construction of the vehicle wheel by way of main member and covering shell, a high level of design variety, or a variable design of the vehicle wheel, is maintained. Finally, the avoidance of doubling-up of material in the region of the receptacles may also have a positive effect on a weight reduction.

As a result, a vehicle wheel can be specified which, despite having a low weight and adequate stiffness, permits a secure attachment while permitting a high degree of design flexibility.

The receptacles provided in the attachment region of the main member for the attachment means may be formed in a particularly simple manner as feed throughs or holes, for example bolt holes. In this case, the attachment means are preferably in the form of pins, bolts or screws which can be fed partially through the receptacles and fastened to a hub of the vehicle. Through the interaction of the attachment means with the main member in the region of the receptacles, the vehicle wheel can then be fixed to the hub of the vehicle.

It is preferable for not only the covering shell but also the main member to be of shell-like form. The main member preferably has a central hub opening which is adapted to a hub of the vehicle for mounting purposes. The receptacles in the attachment region of the main member are preferably arranged on a concentric circular line around the hub opening, preferably at regular intervals. In other words, the receptacles in the attachment region of the main member are arranged in the form of a circle of holes around the axis of the vehicle wheel. Thus, a high level of compatibility with common wheel hubs, and a simple and secure attachment, are realized.

The covering shell is preferably provided exclusively for covering the main member on one side and at the outside, such that the design of the vehicle wheel at the outside can be adapted with little material outlay. The outside is intended to mean the side pointing away from the vehicle in the mounted state.

The covering shell is preferably of one-piece form in order to realize the simplest possible production and high stiffness of the covering shell and thus of the vehicle wheel.

The provision of a main member and of a covering shell that is separate therefrom furthermore yields a high level of modularity of the vehicle wheels, because different covering shells can be designed to be compatible with an identical main member, such that different covering shells can be combined with main members that are in each case of identical form. This facilitates the production of the vehicle wheel because, during the production of the main member, the final design of the vehicle wheel does not have to be allowed for. For example, vehicle wheels with main members of identical form and with different covering shells are thus possible.

Here, particularly good stiffness characteristics with low weight are achieved in that the main member, the wheel-rim ring and/or the covering shell are produced in a sheet-metal type of construction. The sheet metal for producing the components preferably has a thickness of at most 5 mm, preferably at most 4 mm.

The geometry of the covering shell may optionally be flow optimized by virtue of the flow resistance of the vehicle wheel being kept as low as possible by way of the shaping of the covering shell.

In one refinement of the vehicle wheel, the covering shell has a central hole such that the main member is free from the covering shell at least in the region of the receptacles. Thus, at least the region of the receptacles, or the region around the receptacles in the attachment region of the main member, is free from the covering shell. By means of a centrally arranged hole in the covering shell, it is achieved in a simple manner that the main member is free from the covering shell in the region of the receptacles in the attachment region of the main member. Furthermore, in this way, the weight of the covering shell is advantageously reduced. The central hole is in this case preferably circular. The covering shell is preferably designed such that the attachment region is substantially completely free from the covering shell.

It is however possible to provide a local covering cap for the attachment region, which local covering cap substantially covers the central hole of the covering shell, and thus locally covers the attachment region of the main member. This is advantageous in particular if the attachment region is substantially completely free from the covering shell. Thus, it is possible in the attachment region, too, for a high level of design freedom to be realized by way of the local covering cap, and for the attachment region to be protected.

In an alternative refinement of the vehicle wheel to that mentioned above, the covering shell is spaced apart from the main member at least in sections in the attachment region of the main member, such that the main member is free from the covering shell at least in the region of the receptacles. In this way, the covering shell can be of substantially continuous or closed form in the attachment region of the main member, making possible to realize a more uniform appearance of the vehicle wheel. In this case, however, cutouts in the covering shell in each case in the region of the receptacles are advantageous in order to be able to feed the attachment means through the covering shell.

In a further refinement of the vehicle wheel, the main member has a stiffening undulation, and the covering shell ends at least in sections in the region of the stiffening undulation as viewed in a radially inward direction. The stiffening undulation runs preferably concentrically around the axis of the vehicle wheel or around the hub opening of the main member. The stiffening undulation preferably runs around the attachment region of the main member. It has been found that, in this case, a stable construction of low weight can be produced in a simple manner.

In particular, the covering shell may particularly advantageously be connected to the main member in the region of the stiffening undulation. In this regard, it is however likewise conceivable for a stiffening undulation to be provided in the main member and, as already described, for the covering shell to be of substantially continuous or closed form in the attachment region of the main member and to be designed to be spaced apart from the main member at least in sections in the attachment region of the main member. In this case, too, it is advantageous for the main member to be connected to the covering shell in the region of the stiffening undulation.

If, according to a preferred refinement of the vehicle wheel, the covering shell is designed to bear a part of the operating load, in particular to bear a smaller part of the operating load than the main member, the supporting structure is formed by an assembly composed of main member and covering shell. The stiffness of the vehicle wheel is increased in a particularly advantageous manner in this way. At the same time, owing to the load distribution between main member and covering shell, it is possible to realize a material saving and thus a weight reduction in the case of the main member, as the latter can for example be designed to be thinner. This may furthermore have a positive influence on the production of the vehicle wheel, because the main member can then be deformed more efficiently, in particular with lower forces, owing to the relatively thin form, whereby the press forces can be reduced.

It has been found that a high level of stiffness is achieved if the covering shell bears a smaller part of the operating load than the main member. This is advantageous in particular because the main member is free from the covering shell in the region of the receptacles, and it is preferably only the main member that is directly connected to a hub of the vehicle by way of the attachment means. The main member preferably bears not only a greater part of the operating load than the covering shell but also the predominant part of the operating load.

In a further preferred refinement of the vehicle wheel, the covering shell is connected to the main member and/or to the wheel-rim ring in particular in cohesive, non-positively locking and/or positively locking fashion. It has been found that, by means of the connection of the covering shell to the main member and/or to the wheel-rim ring, a stable supporting structure can be provided even without the covering shell being fastened, together with the main member, to a hub of the vehicle by way of the attachment means in the region of the receptacles of the main member. The covering shell is preferably connected both to the main member and to the wheel-rim ring.

For the connection of the covering shell, use is made in particular of connecting methods such as welding, for example laser welding, and/or brazing, in particular if the components to be connected are composed of metal, preferably steel. The connecting process may be performed in particular in a protective gas atmosphere, optionally with inert (MIG) or active gas (MAG). It is preferable for a MAG welding and/or a MIG brazing process to be performed. CMT brazing and/or CMT welding may likewise alternatively be performed. As an alternative cohesive connection, an adhesive connection may also be provided, which can in particular yield increased freedom with regard to the material selection of the components. As a positively locking and/or non-positively locking connection, it is for example possible for the covering shell to be at least regionally pressed into the main member and/or the wheel-rim ring. However, low-heat or heat-free joining methods are particularly preferred, such as for example brazing or adhesive bonding, in order that the shape or structure of the components to be connected are influenced to the least possible extent. A further connecting option is cold joining techniques, such as for example punch riveting, clinching, flanging, in particular also with a view to mixed structural solutions.

The possible connecting zones in which the covering shell is or can be connected to the main member and/or to the wheel-rim ring are dependent on the respective specific geometry of the components. The covering shell and the main member are preferably designed such that one possible connecting zone between the covering shell and the main member lies in the radially inner end region of the covering shell, in the region of a stiffening undulation of the main member and/or in the region of one or more spokes of the main member and/or of the covering shell, in particular in the edge region of the spokes. The covering shell and the wheel-rim ring are preferably designed such that one possible connecting zone between the covering shell and the wheel-rim ring lies in the radially outer end region of the covering shell, which may be formed for example by a ring-shaped region or by the radially outer ends of the spokes.

In a further refinement of the vehicle wheel, the main member and the covering shell are of spoked type of construction, and the spokes of the covering shell, at least in sections, cover at least a part of the spokes of the main member. The main member and the covering shell thus have multiple radially running spokes, for example an even or odd number of spokes, for example between 3 and 20 spokes. The covering shell and the main member preferably have the same number of spokes.

It has been found that, with a spoked type of construction both of the main member and of the covering shell, it is possible to realize adequate stiffness and weight optimization even though the main member is free from the covering shell at least in the region of the receptacles. Furthermore, by means of the spoked type of construction, a visually appealing design of the vehicle wheel, and additional design freedom, are achieved.

The statement that the spokes of the covering shell cover at least a part of the spokes of the main member means that the spokes of the covering shell do not need to cover all of the spokes of the main member. This may be the case in particular if the main member has a greater number of spokes than the covering shell. The statement that the spokes of the covering shell, at least in sections, cover the spokes of the main member means that the spokes of the covering shell do not need to completely cover the spokes of the main member. In particular, the spokes of the covering shell may have cutouts for further weight reduction and/or design purposes.

If the main member and the covering shell are of spoked type of construction, it is particularly advantageous for the covering shell to be connected to the main member at least in sections in the region of the spokes.

In a further refinement of the vehicle wheel, the covering shell has at least one ring-shaped region which connects the spokes of the covering shell at their radially outer ends and/or at their radially inner ends. It is however basically also possible for multiple ring-shaped regions to be provided, for example two ring-shaped regions, wherein a radially outer ring-shaped region connects the spokes of the covering shell at their radially outer ends and a radially inner ring-shaped region connects the spokes of the covering shell at their radially inner ends. By means of one or more ring-shaped regions, the stability and stiffness of the vehicle wheel can furthermore be increased.

If, as per a further refinement of the vehicle wheel, the covering shell, the main member and/or the wheel-rim ring are produced from sheet steel, this yields a particularly advantageous stiffness characteristics together with a low overall weight of the vehicle wheel.

In particular, the main member and/or the covering shell may be produced for example by deep-drawing of sheet steel. Alternatively, hot forming may be performed. The wheel-rim ring may be produced for example from sheet steel by way of a profiling process. Additionally or alternatively, however, it is also conceivable for further production methods and in particular deformation methods to be used for the individual components. For example, deformation by flow forming may be performed.

In a further refinement of the vehicle wheel, the covering shell, the main member and/or the wheel-rim ring are composed of a material having high-grade steel, aluminum, magnesium, a multi-layer material and/or a fiber-reinforced plastic. In particular, it is possible for the covering shell, the main member and/or the wheel-rim ring not only to have but also be composed of the stated materials. The materials permit an optimum adaptation to the respective demands of the components, in particular with regard to stiffness, while permitting a variable design. If a multi-layer material, in particular a metallic multi-layer material, is provided, this is preferably produced by roll cladding. It is preferably primarily the covering shell that is produced from said materials. For the wheel-rim ring, aside from steel, use may be made in particular of a fiber-reinforced plastic. Substantially independently of the material, it is furthermore possible for the covering shell to be pre-lacquered for a further improvement of the surface characteristics.

In a further refinement of the vehicle wheel, the covering shell, the main member and/or the wheel-rim ring are produced from a semifinished part locally adapted to the loading, in order to provide tailored components and thus further improved stiffness with low weight and long component service life. Such semifinished parts locally adapted to the loading may in particular be strips, for example "tailored strips" such as "tailor-rolled strips" or "tailor-welded strips", or metal sheets, for example "tailored blanks" such as "tailor-welded blanks" or "tailor-rolled blanks", which have different materials, material characteristics and/or geometry regions, in particular thickness regions.

In a further refinement of the vehicle wheel, the wheel-rim ring is connected to the main member and/or to the covering shell in the region of a well base of the wheel-rim ring and/or in the region of a wheel-rim flange of the wheel-rim ring. A connection of the main member or of the covering shell in the region of a shoulder or of a wheel-rim flange of the wheel-rim ring (full-face or semi-full-face concept) can for example provide more space at the inside of the main member, for example for a brake assembly. By contrast, a connection situated further to the inside in the region of a well base of the vehicle wheel may be necessary in order to realize the required stiffness of the vehicle wheel or in order to provide adequate space for the covering shell.

The attachment of the main member to the wheel-rim ring is particularly preferably realized in the well base of the wheel rim. By contrast, the attachment of the covering shell to the wheel-rim ring is preferably performed in the region of the wheel-rim flange, because in this way, it is possible to combine a relatively high stiffness with an appealing appearance; in particular, in this way, it is possible for the wheel diameter to be visually enlarged.

According to a second teaching of the invention, the object mentioned in the introduction is achieved, in the case of a generic method for producing a vehicle wheel, in that the main member is connected to the covering shell and remains free from the covering shell at least in the region of the receptacles.

As stated with regard to the vehicle wheel, by virtue of the fact that the main member is connected to the covering shell but remains free from the covering shell at least in the region of the receptacles, it is achieved that no material of the covering shell is present in the immediate vicinity of the receptacles, and, in said region, there is no doubling-up of material by way of the material of the main member, on the one hand, and covering shell, on the other hand. During the mounting of the vehicle wheel, for example onto a hub of the vehicle, it is therefore possible to achieve in particular that the attachment means duly connect the main member, but not the covering shell, directly to the vehicle. The absence of the covering shell in the region of the receptacles consequently has a positive influence on the secure attachment of the vehicle wheel, such that as a result, it is possible to specify a method for producing a vehicle wheel which, despite a low weight and adequate stiffness, exhibits no pre-load losses while permitting a high degree of design flexibility. With regard to the connection between the covering shell and the main member and also with regard to a connection between the covering shell and the wheel-rim ring and/or between the main member and the wheel-rim ring, reference is made to the above statements relating to the vehicle wheel.

In one advantageous refinement of the method, the main member is produced in identical form for different covering shells. It is thus possible for different covering shells to be used which are however compatible or combinable with an identical main member. This leads to an efficient production process, because, for vehicle wheels of different design, only the covering shell is adapted, and no different tools are required for the production of the main member.

In a further advantageous refinement of the method, the covering shell is produced from sheet steel, in particular by deep drawing. This gives rise to particularly advantageous stiffness characteristics with a low overall weight of the vehicle wheel, while use is made of an efficient production method which is suitable for mass manufacture. The main member and/or the wheel-rim ring may also advantageously be produced from sheet steel. In particular, in this case, the main member is also produced by way of a deep-drawing process. With regard to alternative production methods and materials, reference is made to the above statements relating to the vehicle wheel.

In a further refinement of the method according to the invention, firstly, the main member is connected to the wheel-rim ring, and subsequently, the covering shell is connected to the main member and optionally additionally to the wheel-rim ring. In an alternative method, firstly, the main member is connected to the covering shell, and subsequently, the wheel-rim ring is connected to the main member and optionally additionally to the covering shell. By means of individual or separate manufacture of the main member, of the wheel-rim ring and of the covering shell and the subsequent assembly in stages, the production of the vehicle wheel is made simple and efficient. In particular, by way of the connection of the covering shell to the main member, while the latter remains free from the covering shell at least in the region of the receptacles, a secure attachment of the vehicle wheel to be produced can be achieved. With regard to possible types of connection between the main member, the wheel-rim ring and the covering shell, reference is made to the statements relating to the vehicle wheel.

Likewise, for possible refinements and advantages of the production method, reference is made to the statements relating to the vehicle wheel.

Figure 1:
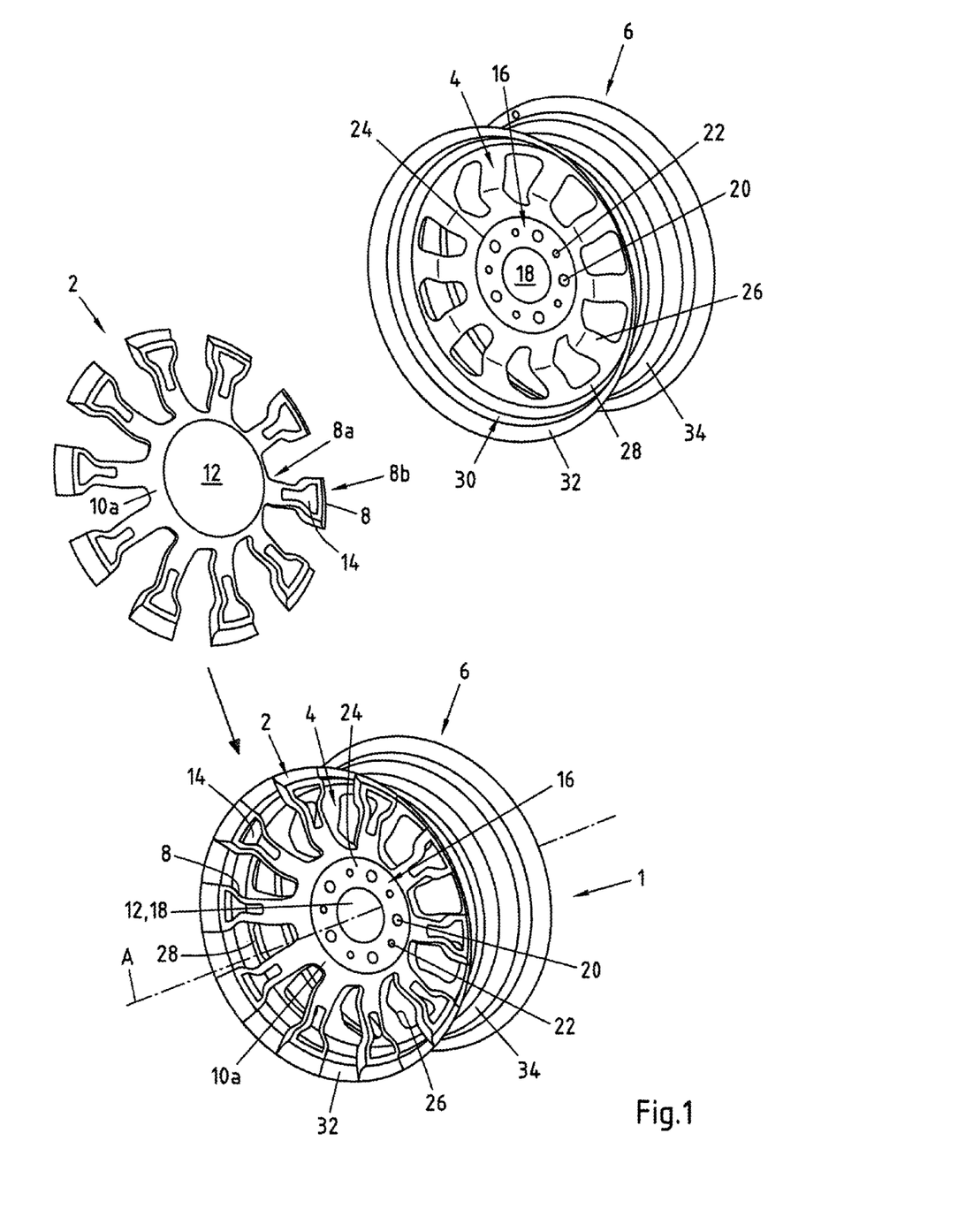
FIG. 1 is a schematic view of an example method by which an example vehicle wheel may be produced by combining an example wheel-rim ring, an example main member, and an example covering shell.

FIG. 1 schematically shows a method for producing a vehicle wheel 1. The illustration shows both a covering shell 2 and also a main member 4 together with a wheel-rim ring 6, which are illustrated having already been connected to one another. The covering shell 2 is joined to the assembly composed of main member 4 and wheel-rim ring 6 to form the illustrated vehicle wheel 1, as indicated by the arrows.

In this exemplary embodiment, the covering shell 2 is of spoked type of construction and has the spokes 8 of identical form. In this case, ten spokes are provided, though some other number may also be provided. The spokes 8 extend substantially in a radial direction, wherein the spokes 8 are connected at their radially inner end 8a to a ring-shaped region 10a. Here, the ring-shaped region 10a delimits a central circular hole 12. The ring-shaped region serves as a potential region of attachment of the covering shell 2 to the main member 4. The radially outer ends 8b of the spokes 8 furthermore each have an attachment region, which attachment regions serve in this case for the attachment of the covering shell 2 to the wheel-rim ring 6. Alternatively or in addition, it is however also possible for an attachment to the main member 4 to be provided by way of said attachment regions. The spokes 8 furthermore each have a recess 14, which can lead to a weight reduction and simultaneously produce a desired visual impression. The covering shell 2 is furthermore of slightly funnel-shaped form, that is to say the covering shell 2 is curved toward the inside of the vehicle wheel 1 as viewed in a radially inward direction. In this example, the covering shell 2 is produced by deep drawing from sheet steel, for example high-grade steel. It is however also possible for alternative metals such as aluminum or magnesium to be used.

Furthermore, it is also possible for alternative materials such as a roll-clad metallic multi-layer material or a fiber-reinforced plastic to be used.

The main member 4 is likewise of shell-like or plate-like form and is likewise of spoked type of construction. The main member 4 has, in its central region, an attachment region 16 which serves for the attachment of the vehicle wheel 1 to the vehicle (not illustrated). The attachment region 16 has a central, circular hub opening 18 which can be mounted onto a hub of the vehicle. In this case, around the hub opening 18, five receptacles 20 in the form of bolt holes are arranged on a concentric circle around the hub opening 18 and at uniform intervals. The bolt holes 20 can receive attachment means (not illustrated) in the form of bolts, screws or pins for the attachment to the vehicle. Between two bolt holes 20 there is arranged in each case one further positioning hole 22 which may facilitate the mounting onto the vehicle. The attachment region 16 is adjoined, as viewed in a radially outward direction, by a stiffening undulation 24 in the form of an outwardly domed bead. The stiffening undulation 24 runs likewise concentrically around the axis A of the vehicle wheel 1 or around the hub opening 18 of the main member 4. Said ring-shaped inner region of the main member 4 is adjoined by radially inner ends of spokes 26 of identical design. In this case, exactly the same number of spokes as in the covering shell 2 is provided, though some other number may also be provided. The spokes 26 extend substantially in a radial direction. The radially outer ends of the spokes 26 are in turn connected to a ring-shaped region 28 which serves for the attachment of the main member 4 to the wheel-rim ring 6. In this case, the main member 4 is likewise manufactured from sheet steel by deep drawing.

The wheel-rim ring 6 is of substantially cylindrical form with an opening 30, wherein the main member is already arranged in the opening 30. In particular, the profile of the wheel-rim ring 6 has an encircling wheel-rim flange 32 and an encircling well base 34. In this case, the wheel-rim ring is produced from profiled sheet steel. It is however also possible, for example, for fiber-reinforced plastic to be provided.

After the main member 4 and the wheel-rim ring 6 have been produced separately, the main member 4 has been connected by way of the ring-shaped region 28 to the wheel-rim ring 6 in the region of the well base 34. For example, the main member 4 may be welded or brazed to the wheel-rim ring 6, for example by MAG welding or by MIG brazing. Alternatively or in addition, however, it is also possible for adhesive bonding or a pressing-in action to be used.

After the connection of main member 4 and wheel-rim ring 6, the assembly is connected to the covering shell 2, so as to yield the vehicle wheel 1 illustrated in FIG. 1. Here, the covering shell is applied to the assembly composed of main member 4 and wheel-rim ring 6 from the outside. Since the hole 12 of the covering shell 2 is adapted to the stiffening undulation 24 of the main member 4, the covering shell 2 ends, as viewed in a radially inward direction, by way of the ring-shaped region 10a in the region of the stiffening undulation 24 of the main member 4. In this way, the main member 4 remains free from the covering shell 2 in the attachment region 16 and thus in the region of the receptacles 20. By virtue of the fact that the main member 4 is free from the covering shell 2 in any case in the region of the receptacles 20, no material of the covering shell 2 is present in the immediate region of the receptacles 20, such that no doubling-up of material of main member 4 and covering shell 2 occurs in said region. During the mounting of the vehicle wheel 1, although the attachment means (not illustrated) interact with the receptacles 20 in the main member 4, they do not interact with the covering shell 2, such that the covering shell 2 is not directly involved in the attachment of the vehicle wheel 1 to the vehicle. In this way, a secure attachment of the vehicle wheel 1 to the vehicle is made possible, because the required preload by way of the attachment means is not adversely affected by the covering shell 2 in the region of the receptacles 20.

It is however alternatively also possible for the covering shell 2 to be of continuous form in its central region 12. Then, by way of the covering shell 2 being spaced apart from the main member 4 at least in sections, it can be achieved that the main member 4 is free from the covering shell 2 in the region of the receptacles 20.

In the case of an alternative production method, it is also possible for the covering shell 2 to firstly be connected to the main member 4, and for the assembly to subsequently be inserted into and connected to the wheel-rim ring 6.

In this case, the covering shell 2 is connected to the main member 4 in the ring-shaped region 10a of the covering shell 2. Furthermore, the geometry of the spokes 8 of the covering shell 2 is in any case adapted in sections to the geometry of the spokes 26 of the main member 4. In this way, it is possible for the covering shell 2 to also be connected to the main member 4 in the region of the spokes 8. For example, the covering shell is connected to the spokes 26 at least in sections in the marginal or edge region of the spokes 8. Furthermore, the ends 8b of the spokes 8 of the covering shell are adapted to the wheel-rim flange 32 of the wheel-rim ring 6. In this way, a connection of the covering shell 2 to the wheel-rim ring 6 is possible in said region. The connections may be realized for example by way of welding, brazing, adhesive bonding or pressing in, to name but a few examples.

Owing to the connections between main member 4, wheel-rim ring 6 and covering shell 2, it is achieved that both the main member 4 and the covering shell 2 form a load-bearing structure and together bear the operating load of the vehicle tire 1. In this way, the sheet-metal thickness of the main member 4 can be reduced in relation to conventional steel wheels. Adequate stiffness of the vehicle wheel 1 is insured even though there is no direct attachment of the covering shell 2 by way of the attachment means. At the same time, however, by way of the modular construction of the vehicle wheel in the form of main member 4 and covering shell 2, a high level of design variety, or a variable design, of the vehicle wheel 1 is achieved.

Figure 2:
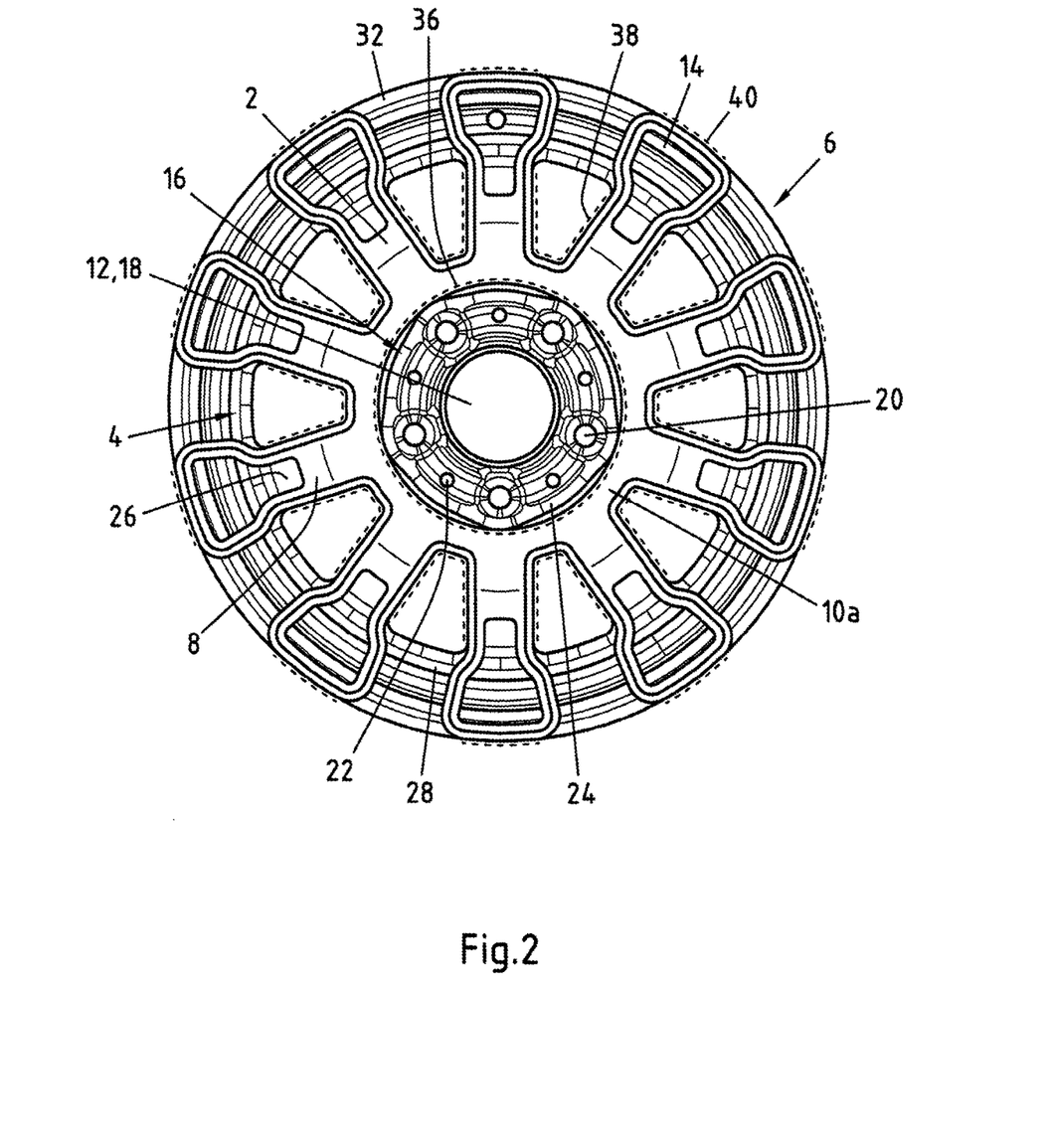
FIG. 2 is a front view of the example vehicle wheel of FIG. 1.

The possible connecting zones of the covering shell to the main member and to the wheel-rim ring in this example are illustrated once again in FIG. 2, which shows the vehicle wheel from FIG. 1 frontally from the outside. A connection of the covering shell 2 to the main member 4 can be realized in the regions 36 and 38, whereas a connection of the covering shell 2 to the wheel-rim ring can be realized in the regions 40. It is however also possible for only some of the regions, or sub-regions, to be used for the connection of the covering shell 2.

Figure 3:
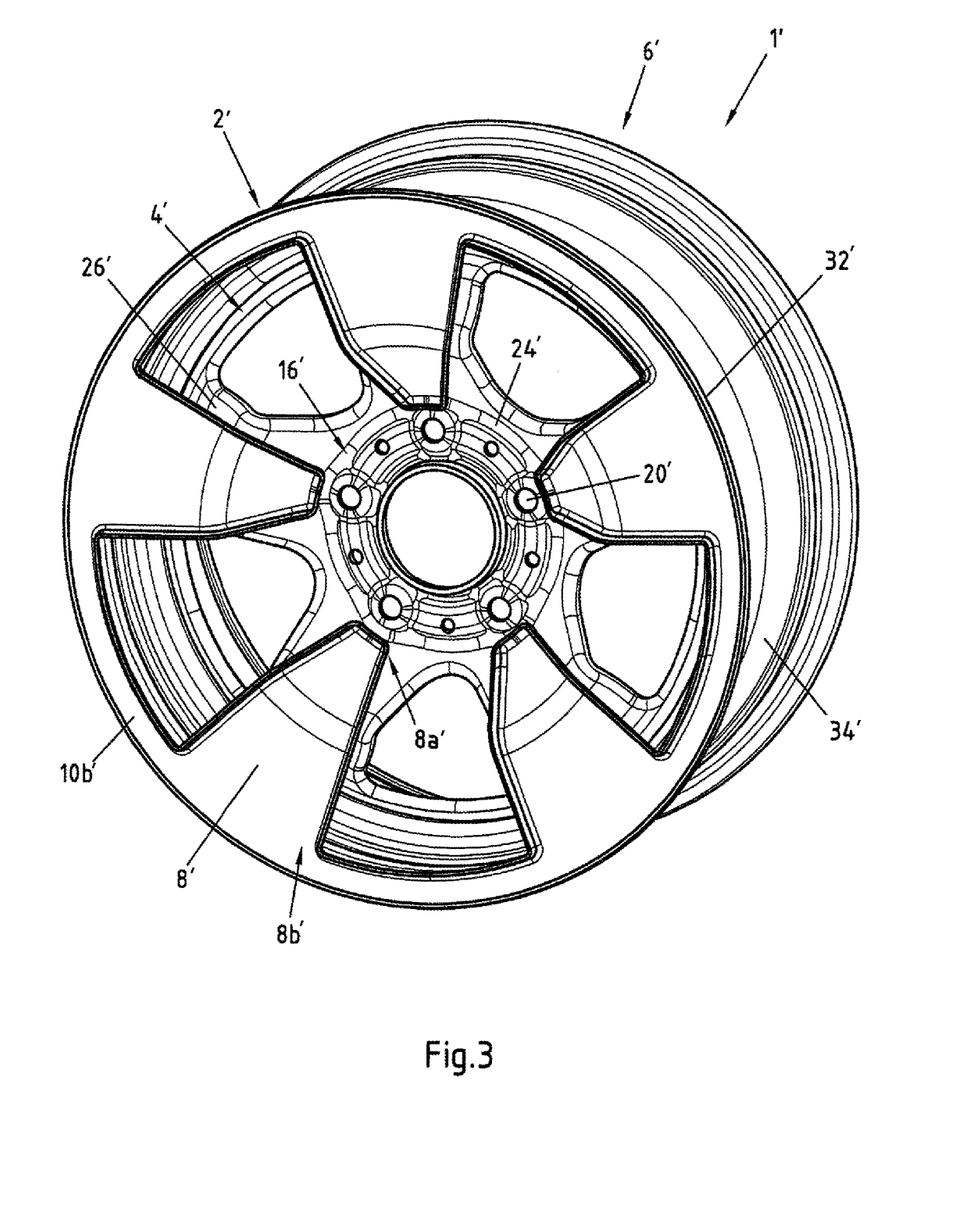
FIG. 3 is a perspective view of an example vehicle wheel.
Figure 4:
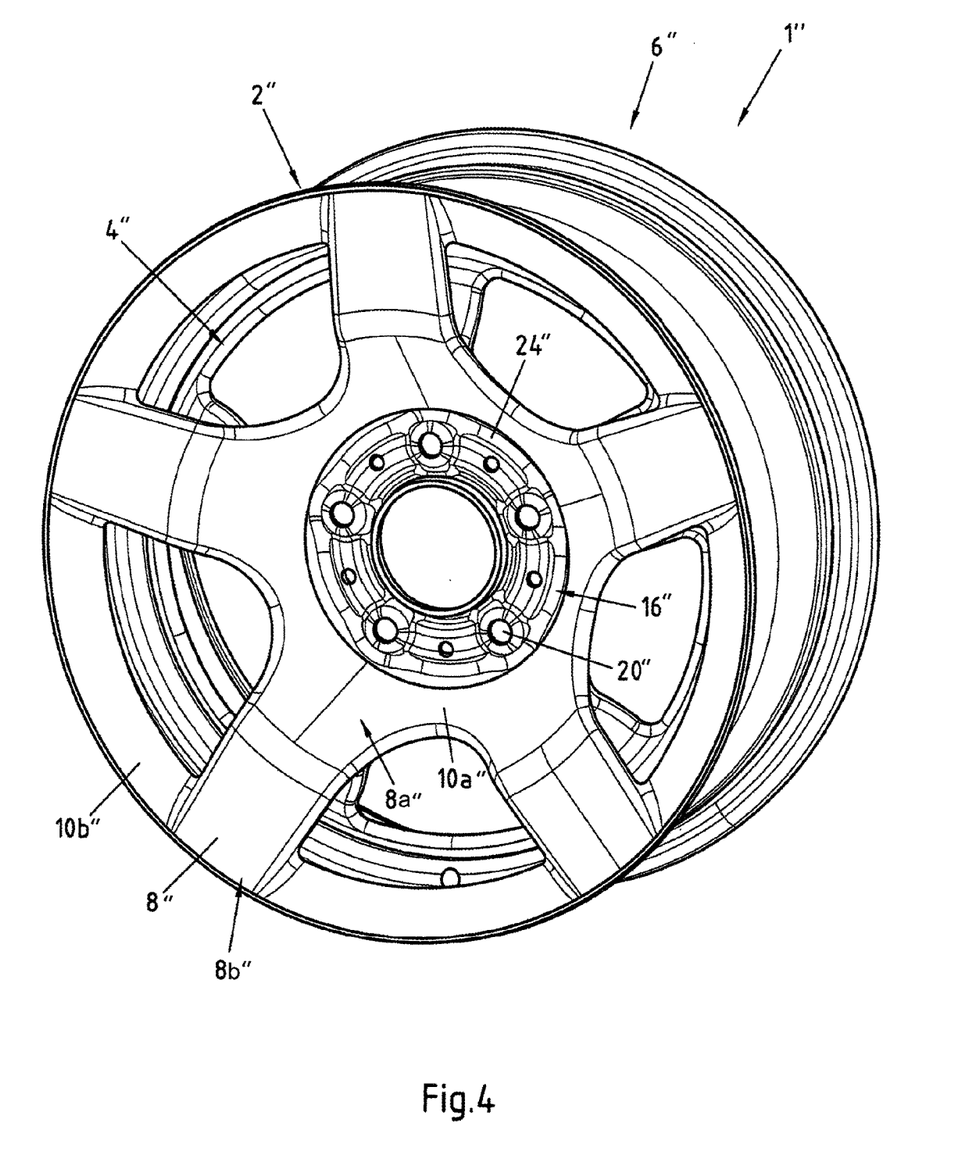
FIG. 4 is a perspective view of another example vehicle wheel.

FIGS. 3 and 4 show second and third exemplary embodiments of a vehicle wheel 1', 1" respectively in a perspective view. The example vehicle wheels 1' and 1" differ from the example vehicle wheel 1 shown in FIGS. 1 and 2 primarily by the example covering shells 2', 2" and the example main members 4', 4". The wheel-rim ring 6', 6" is however of the same design. In this respect, only the differences in relation to the vehicle wheel 1 already described above will be discussed below.

The covering shell 2' and the main member 4' of the vehicle wheel 1' shown in FIG. 3 are in this case composed in each case of five spokes 8' and 26' respectively. The spokes do not have recesses 14. Otherwise, however, the main member 4' from FIG. 3 is designed in the manner of the main member 4 of the vehicle wheel 1. The spokes 8' of the covering shell 2' are, in the exemplary embodiment of FIG. 3, connected at their radially outer ends 8b' by a ring-shaped region 10b'; no ring-shaped region is provided at the radially inner ends 8a' of the spokes 8'. The covering shell 2' ends, as viewed in the radially inward direction, by way of its radially inner ends 8a' of the spokes 8' in the region of the stiffening undulation 24' of the main member 4', wherein the spokes 8' taper in a radially inward direction. As a result, the main member 4' is again free from the covering shell 2' in the attachment region 16' and thus in the region of the receptacles 20'. Owing to the ring-shaped region 10b', the covering shell 2' affords flexible possibilities for connection to the wheel-rim ring 6' at the wheel-rim flange 32', 32".

The example covering shell 2" and the example main member 4" of the vehicle wheel 1" shown in FIG. 4 are likewise composed of five spokes 8". The main member 4" from FIG. 4 corresponds to the main member 4' of the vehicle wheel 1' from FIG. 3. In the exemplary embodiment of FIG. 4, the spokes 8" of the covering shell 2" are connected both at their radially inner ends 8a" and at their radially outer ends 8b" by a respective ring-shaped region 10a" and 10b". Increased stiffness of the covering shell 2" and thus of the vehicle wheel 1" is achieved in this way. The covering shell 2" ends, as viewed in the radially inward direction, in the region of the stiffening undulation 24" of the main member 4", such that again, the main member 4" is free from the covering shell 2" in the attachment region 16" and thus in the region of the receptacles 20".

In the case of the vehicle wheels 1' and 1", too, it is achieved that the main member 4 and the covering shell 2 together form a load-bearing structure, and together bear the operating load of the vehicle wheel 1' or 1", whereby it is possible in particular for the sheet-metal thickness of the main member 4 to be reduced in relation to conventional steel wheels.

As is furthermore evident from a comparison of the vehicle wheels 1' and 1" of FIGS. 3 and 4, it may be possible for the same wheel-rim ring 6', 6", and in particular the same main member 4', 4", to be used for different covering shells 2', 2" and thus for different designs. For a different design, it is thus merely necessary for the covering shell 2', 2" to be adapted or exchanged.

What is claimed is:

1. A vehicle wheel for motor vehicles, the vehicle wheel comprising:
   a wheel-rim ring having an opening;
   a main member positioned at least partially in the opening of the wheel-rim ring, wherein the main member has an attachment region with receptacles for attachment to a vehicle, wherein the main member comprises spokes, wherein the main member is connected to the wheel-rim ring; and
   a covering shell for at least partially covering the main member, wherein the main member is free from the covering shell at least in the attachment region with the receptacles, wherein the covering shell comprises spokes, wherein the spokes of the covering shell at least partially cover the spokes of the main member, wherein the spokes of the covering shell have radially outer ends and radially inner ends, wherein the covering shell directly contacts the main member and directly contacts the wheel-rim ring, wherein the covering shell is connected directly to the main member and directly to the wheel-rim ring via welding or brazing,
   wherein the covering shell, the main member and the wheel-rim are produced from sheet steel,
   wherein the covering shell and the main member together bear an operating load, wherein the covering shell bears a smaller portion of the operating load than the main member,
   wherein either
      the covering shell comprises a radially inner ring-shaped region that connects the radially inner ends of the spokes of the covering shell and the covering shell is connected to the main member in the inner ring-shaped region of the covering shell, wherein the outer ends of the spokes each are connected to the wheel-rim ring, or
      the covering shell comprises a radially outer ring-shaped region that connects the radially outer ends of the spokes of the covering shell and the covering shell is connected to the wheel-rim ring in the outer ring-shaped region of the covering shell, wherein the spokes taper in a radially inward direction.

2. The vehicle wheel of claim 1 wherein the covering shell comprises a central hole that permits access to the attachment region of the main member.

3. The vehicle wheel of claim 2 wherein the main member comprises a stiffening undulation, wherein the covering shell terminates at least in sections in a region of the stiffening undulation.

4. The vehicle wheel of claim 1 wherein at least one of the covering shell, the main member, or the wheel-rim ring are produced from a semifinished part that is locally adapted for loading.

5. The vehicle wheel of claim 1 wherein the wheel-rim ring comprises a well base and a wheel-rim flange, wherein the wheel-rim ring is connected to at least one of the main member or the covering shell in at least one of a region of the well base or in a region of the wheel-rim flange.

6. The vehicle wheel of claim 1 wherein the main member is compatible with a plurality of types of covering shells.

7. A wheel comprising:
a wheel-rim ring having an opening;
a main member disposed in the opening of the wheel-rim ring, wherein the main member has an attachment region with receptacles for attaching the main member and the wheel-rim ring to a vehicle, wherein the main member comprises spokes; and
a covering shell that at least partially covers the main member, wherein to permit access to the attachment region of the main member the covering shell either has a cutout corresponding to the attachment region or is spaced apart from the attachment region, wherein the covering shell comprises spokes, wherein the spokes of the covering shell at least partially cover the spokes of the main member, wherein the spokes of the covering shell have radially outer ends and radially inner ends,
wherein the covering shell, the main member and the wheel-rim are produced from sheet steel,
wherein the covering shell and the main member together bear an operating load, wherein the covering shell bears a smaller portion of the operating load than the main member,
wherein either
the covering shell comprises a radially inner ring-shaped region that connects the radially inner ends of the spokes of the covering shell and the covering shell is connected to the main member in the inner ring-shaped region of the covering shell via welding or brazing, wherein the outer ends of the spokes each are connected to the wheel-rim ring via welding or brazing, or
the covering shell comprises a radially outer ring-shaped region that connects the radially outer ends of the spokes of the covering shell and the covering shell is connected to the wheel-rim ring in the outer ring-shaped region of the covering shell via welding or brazing, wherein the spokes taper in a radially inward direction.

8. The wheel of claim 7 wherein the spokes of the covering shell each comprise a recess for reducing a weight of the covering shell.

9. The wheel of claim 7 wherein the covering shell comprises a central hole that permits access to the attachment region of the main member.

10. The wheel of claim 7 wherein the main member comprises a stiffening undulation, wherein the covering shell terminates at least in sections in a region of the stiffening undulation.

11. The wheel of claim 7 wherein the wheel-rim ring comprises a well base and a wheel-rim flange, wherein the wheel-rim ring is connected to at least one of the main member or the covering shell in at least one of a region of the well base or in a region of the wheel-rim flange.

* * * * *